(12) United States Patent  
Doo et al.

(10) Patent No.: US 9,197,351 B2
(45) Date of Patent: Nov. 24, 2015

(54) METHOD OF SELECTING WAVELENGTH OF OPTICAL NETWORK UNIT IN PASSIVE OPTICAL NETWORK

(71) Applicant: Electronics and Telecommunications Research Institute, Daejeon-si (KR)

(72) Inventors: Kyeong-Hwan Doo, Daejeon-si (KR); Seung-Il Myong, Daejeon-si (KR); Han-Hyub Lee, Daejeon-si (KR); Seung-Hyun Cho, Daejeon-si (KR); Jie-Hyun Lee, Daejeon-si (KR); Sang-Soo Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 109 days.

(21) Appl. No.: 14/082,796

(22) Filed: Nov. 18, 2013

(65) Prior Publication Data

US 2014/0219661 A1    Aug. 7, 2014

(30) Foreign Application Priority Data

Feb. 5, 2013    (KR) .................. 10-2013-0013087

(51) Int. Cl.
| | |
|---|---|
| *H04B 10/50* | (2013.01) |
| *H04B 10/60* | (2013.01) |
| *H04B 10/2587* | (2013.01) |
| *H04J 3/16* | (2006.01) |
| *H04J 14/02* | (2006.01) |

(52) U.S. Cl.
CPC ........... *H04J 14/0227* (2013.01); *H04J 3/1694* (2013.01); *H04J 14/025* (2013.01); *H04J 14/0246* (2013.01)

(58) Field of Classification Search
None
See application file for complete search history.

(56) References Cited

U.S. PATENT DOCUMENTS

2008/0304828 A1*  12/2008  Mizutani et al. ............... 398/78
2012/0328287 A1*  12/2012  Grosso .......................... 398/34

FOREIGN PATENT DOCUMENTS

KR          10-0903121 B1      6/2009

* cited by examiner

*Primary Examiner* — Darren E Wolf
(74) *Attorney, Agent, or Firm* — Rabin & Berdo, P.C.

(57) ABSTRACT

Provided is a method of selecting a wavelength of an optical network unit including selecting a pre-loaded default wavelength as an available wavelength candidate or the wavelength that has been changed when a preset wavelength changing condition is satisfied as the available wavelength candidate, acquiring frame synchronization for a downstream signal having the same wavelength as the selected available wavelength candidate, and transmitting a registration request message to an optical line terminal (OLT) from which the downstream signal has been transmitted when the frame synchronization is acquired, assigning the available wavelength candidate to an available wavelength used for communication with the OLT and registering the terminal in the OLT when a registration allowance message is received from the OLT.

18 Claims, 10 Drawing Sheets

METHOD OF SELECTING WAVELENGTH OF OPTICAL NETWORK UNIT IN PASSIVE OPTICAL NETWORK

CROSS-REFERENCE TO RELATED APPLICATION

This application claims the benefit under 35 U.S.C. §119(a) of Korean Patent Application No. 10-2013-0013087, filed on Feb. 5, 2013, the entire disclosure of which is incorporated herein by reference for all purposes.

BACKGROUND

1. Field

The following description relates to passive optical network technology, and more particularly, to a method and device for selecting a wavelength of an optical network unit in a passive optical network.

2. Description of the Related Art

A passive optical network (PON) is a subscriber network that connects a central office and a subscriber with a point-to-multipoint topology and is cost effective compared to a structure having a point-to-point topology since required central office systems and optical cables can be reduced.

Currently, as a high-speed optical subscriber network, a time division multiplexing passive optical network (TDM-PON), for example, an Ethernet PON (EPON) and a Gigabit-capable PON (GPON), is being widespread through the world. Particularly, the GPON is deployed in many areas of the world. In 2010, the International Telecommunication Union Telecommunication Standardization Sector (ITU-T) completed recommendation of G.987 XG-PON standard (10G-GPON). Recently, early commercial products based on the G.987 are being released.

Recently, as a wavelength division multiplexing optical subscriber network for providing voice, data, and a broadcasting convergence service, research and development on a wavelength division multiplexing passive optical network (WDM-PON) are being active. In the WDM-PON, communication between a central base station and a subscriber is performed using a respective wavelength assigned to each subscriber. Since a dedicated wavelength per subscriber is used, security is excellent and a mass communication service is possible. Moreover, it is possible to apply different transmission technology per subscriber or per service.

Furthermore, the Full Service Access Network (FSAN) Group, which is a standardization group consisting of major communication operators and equipment manufacturers associated with optical subscriber network technology, adopted a time and wavelength division multiplexing passive optical network (TWDM-PON) that is a hybrid type passive optical network using time division multiplexing and wavelength division multiplexing at the same time, as major technology of a next-generation passive optical network (NG-PON2). Therefore, the ITU-T is discussing recommendation for G.ngpon2.x standards.

In order to register an optical network unit/optical network terminal (ONU/ONT, hereinafter referred to as an 'ONU' or a 'terminal') in this hybrid type passive optical network and perform a communication, it is necessary for the terminal to assign a wavelength to be used initially. Methods of assigning an initial available wavelength for the terminal include, a method in which a terminal is firstly connected to a master optical line terminal (OLT) and the master OLT assigns a wavelength to be used in the terminal and informs the terminal of the wavelength, and a method in which an arbitrary wavelength is selected as an initial wavelength and a firstly connected OLT informs the terminal of the wavelength to be used.

However, these methods require the master OLT to know conditions of all other OLTs in advance or each OLT to know conditions of all other OLTs in advance. In addition, it is difficult to use in a network in which systems supporting different protocols are mixed, for example, the EPON and the GPON. Further, since contents are not defined in the existing OLT, it is difficult to implement and manage.

SUMMARY

The following description relates to a method in which an optical network unit (ONU) network unit having a wavelength tunable function directly selects a wavelength to be used in communication, in order to minimize a change of an existing central office system and not to affect to a conventional system from the change, when a hybrid type passive optical communication network system adopting wavelength division multiplexing in a previously built time division multiplexing passive optical communication network is built.

In one general aspect, a method of selecting a wavelength of an optical network unit (ONU) may include selecting a pre-loaded default wavelength as an available wavelength candidate or the wavelength that has been changed when a preset wavelength changing condition is satisfied as the available wavelength candidate; acquiring frame synchronization for a downstream signal having same wavelength as the selected available wavelength candidate; and transmitting a registration request message to an optical line terminal (OLT) from which the downstream signal has been transmitted when the frame synchronization is acquired, and assigning the available wavelength candidate to an available wavelength used for communication with the OLT when a registration allowance message is received from the OLT and registering the ONU in the OLT.

The method may further include communicating with the OLT network unit when the ONU is registered in the OLT The method may further include waiting to maintain a stop state until the registration allowance message is received when a registration rejection message is received from the OLT.

The preset wavelength changing condition may be a condition where the frame synchronization is not acquired for a preset period of time in the acquiring frame synchronization for a downstream signal.

The preset wavelength changing condition may be a condition where either the registration allowance message or the registration rejection message is not received for a preset period of time in the registering the ONU in the OLT.

The preset wavelength changing condition may be a condition where the registration allowance message is not received for a preset period of time period in the waiting to maintain a stop state.

The preset wavelength changing condition may be a condition where a wavelength change request message is received from the OLT.

The method of selecting the wavelength may be performed through a predefined physical layer operation and management (PLOAM) frame between the OLT and the ONU network unit.

The selecting of the pre-loaded default wavelength may include a sequentially increasing method, a priority order method, and a random order method.

The pre-loaded default wavelength may be preset and stored in order to initially use in the registering of the ONU network unit.

The registering the ONU in the OLT may further include storing information about the available wavelength assigned when the ONU is registered, and the selecting of the available wavelength candidate may be selecting the wavelength corresponding to the stored information as the default wavelength.

The changing of the wavelength may be simultaneously performed for wavelengths of upstream and downstream signals in the selecting of the available wavelength candidate.

The registration request message may include unique information containing serial information of the OLT.

The registration allowance message may include a unique identification number of the OLT.

In another aspect, a device for selecting a wavelength of an optical network unit (ONU) may include an available wavelength candidate selecting unit configured to select a pre-loaded default wavelength as an available wavelength candidate or select the wavelength that has been changed when a preset wavelength changing condition is satisfied as the available wavelength candidate; a downstream synchronization unit configured to acquire frame synchronization for a downstream signal having same wavelength as the selected available wavelength candidate; and a terminal register configured to transmit a registration request message to an optical line terminal (OLT) from which the downstream signal has been transmitted when the frame synchronization is acquired, assign the available wavelength candidate to an available wavelength used for communication with the OLT when a registration allowance message is received from the OLT and register the ONU in the OLT.

The preset wavelength changing condition may be a condition where the frame synchronization is not acquired for a preset period of time in the downstream synchronization unit.

The preset wavelength changing condition may be a condition where either the registration allowance message or a registration rejection message is not received for a preset period of time in the terminal register.

The preset wavelength changing condition may be a condition where a wavelength change request message is received from the OLT.

Other features and aspects will be apparent from the following detailed description, the drawings, and the claims.

Figure 1:
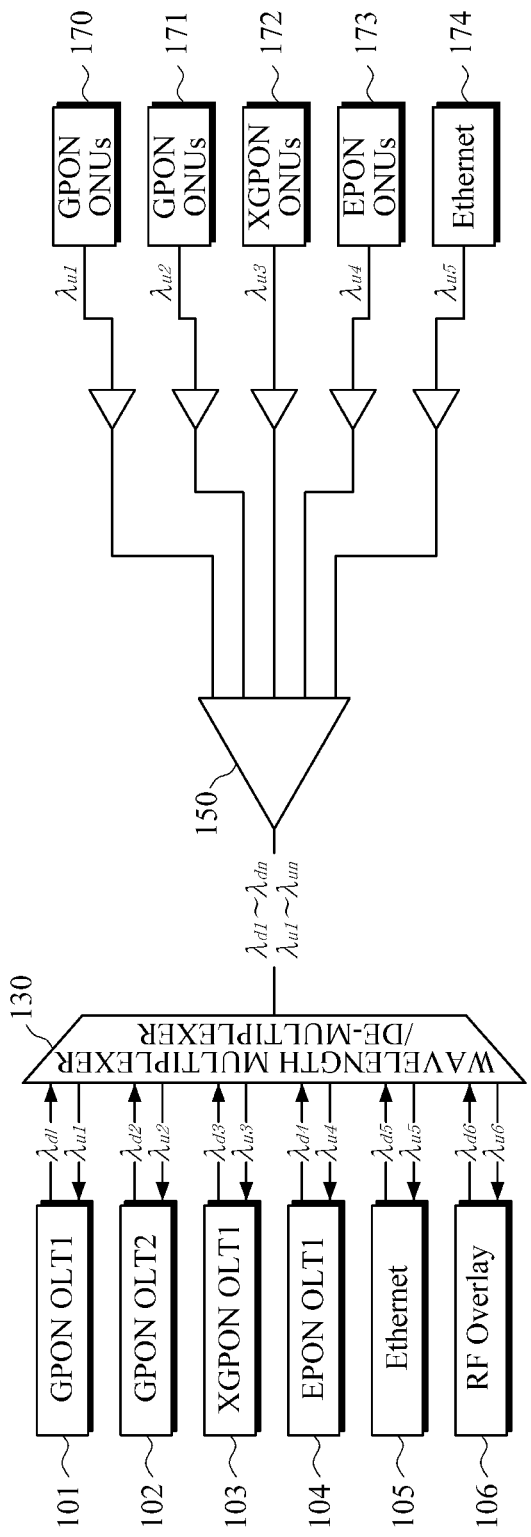
FIG. 1 is a schematic diagram illustrating an open passive optical network according to an exemplary embodiment of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above and other features of the invention will become apparent by describing exemplary embodiments described below. While aspects selectively described or configurations of the embodiments selectively described in this specification are illustrated in a single, unified configuration in drawings, otherwise defined, it is understood for those skilled in the art that configurations can be combined freely with each other unless technically contradictable.

FIG. 1 is a schematic diagram illustrating an open passive optical network according to an exemplary embodiment of the invention.

As illustrated in FIG. 1, an open passive optical network includes terminals 170 to 174, OLTs 101 to 106, a multiplexer/demultiplexer 130, and a splitter 150.

The terminals 170 to 174 are located at customer premises or Curb and connect a subscriber device.

The OLTs 101 to 106 are located at a central office and connect subscriber traffic to an upper network.

The multiplexer/demultiplexer 130 multiplexes or demultiplexes a wavelength in order to connect the terminal and the OLT in accordance with a wavelength.

The splitter 150 is located at a terminal side and connects the multiplexer/demultiplexer 130 and the terminal.

The open passive optical network according to the exemplary embodiment may be a network that provides a plurality of different services, for example, a TDM-PON, a P-to-P, and an RF video overlay. Since the network may has a structure capable of accommodating a plurality of same service or different service links using a plurality of optical wavelength channels, it is possible to increase transmission capacity in proportion to the number of optical wavelength channels in an already established TDM network without modification of an optical distribution network. Therefore, when it is assumed that each central office system accommodates one PON link, one optical distribution network can accommodate n number of same or different networks and each link may be distinguished by a variable or fixed independent wavelength.

An open passive optical network according to another exemplary embodiment may be a mixed network configured with a plurality of different systems. In this case, an EPON ONU 173 uses a fixed wavelength, and GPON ONUs 170 and 171 are selectively connected to an arbitrary OLT between a GPON OLT1 101 and a GPON OLT2 102 each using a different wavelength according to a policy. Accordingly, when there is a plurality of OLTs to which the GPON ONU can be connected in a network, a terminal having a wavelength tunable function is necessary to unify terminals.

An open passive optical network according to another exemplary embodiment may be a hybrid type network that adopts a wavelength multiplexing method in an already established time multiplexing passive optical network. A detailed description thereof will be given below with reference to FIG. 2.

Figure 2:
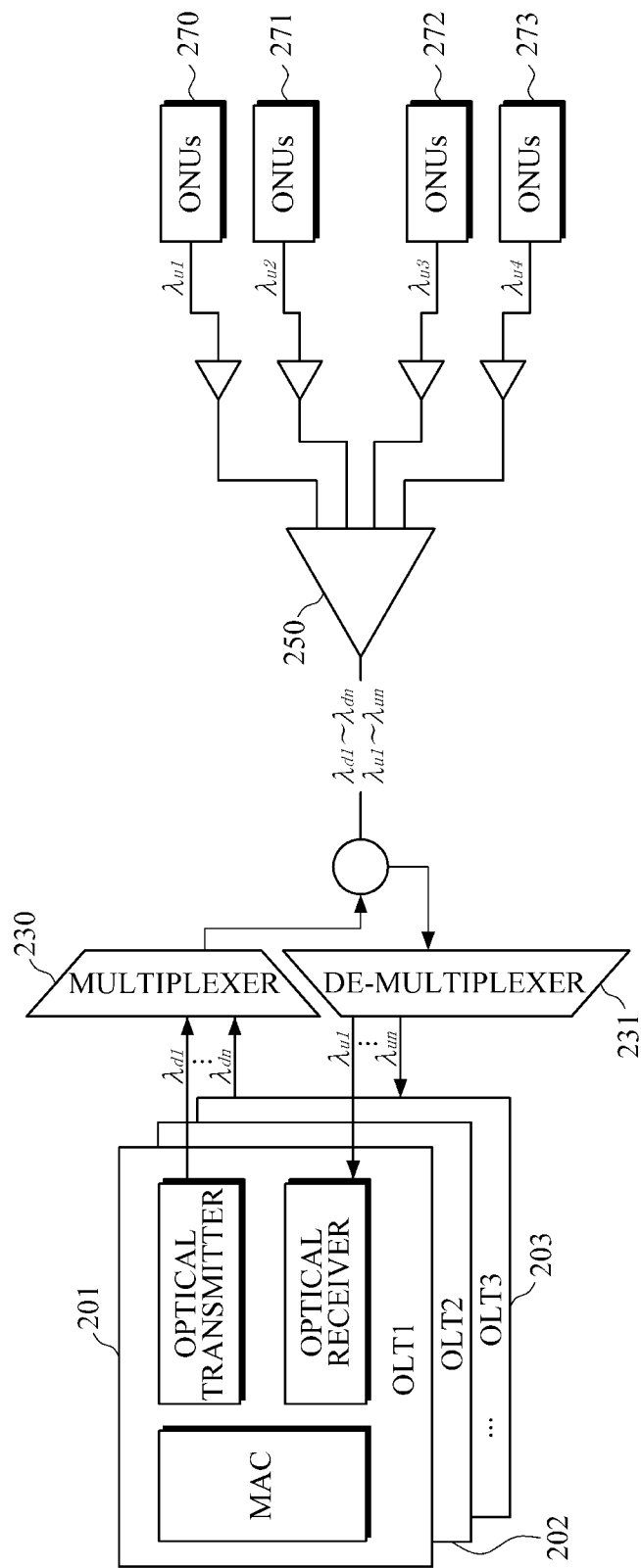
FIG. 2 is a schematic diagram illustrating a passive optical network TWDM-PON according to an exemplary embodiment of the invention.

FIG. 2 is a schematic diagram illustrating a passive optical network TWDM-PON according to an exemplary embodiment of the invention.

As illustrated in FIG. 2, the open passive optical network TWDM-PON includes terminals 270 to 273, OLTs 201 to 203, a multiplexer 230, a demultiplexer 231, and a splitter 250. All terminals may support XGPON1.

The terminals 270 to 273 are located at customer premises or Curb and connect a subscriber device.

The OLTs 201 to 203 are located at a central office and connect subscriber traffic to an upper network.

The multiplexer 230 multiplexes a wavelength in order to connect the terminal and the OLT in accordance with a wavelength.

The demultiplexer 231 demultiplexes a wavelength in order to connect the terminal and the OLT in accordance with a wavelength.

The splitter 250 is located at a terminal side and connects the multiplexer 230/demultiplexer 231 and the terminal.

The TWDM-PON according to the exemplary embodiment may include n OLTs each having a different wavelength to be used, and each OLT may accommodate one PON link. One optical distribution network may accommodate n TDM-PON networks, and each TDM-PON link may be distinguished by a variable or fixed independent wavelength (WDM method). Moreover, one terminal using the same wavelength (downstream $\lambda d1$ and upstream $\lambda u1$) may be included. The terminal 270 may communicate with the OLT1 201 that uses the same wavelength. In the same way, the other terminal 271 may be connected to the OLT2 202.

Since a downstream signal is multiplexed by the multiplexer 230, each of the terminals may receive all downstream wavelengths. That is, since each terminal receives the downstream signal having all wavelengths, each terminal needs to have a wavelength tunable function in order to select a wavelength to be used. Furthermore, an upstream signal may be transmitted to the OLT using the wavelength matching the downstream signal selected by each terminal, separated per wavelength using the demultiplexer 231, and connected to a corresponding OLT. Since the current OLT and terminal follow recommendations of a GPON or XGPON standard, wavelengths used for downstream and upstream are fixed. Accordingly, in order to apply the WDM method to an existing TDM terminal, each terminal needs to have a wavelength tunable function and an available wavelength selecting function.

Figure 3:
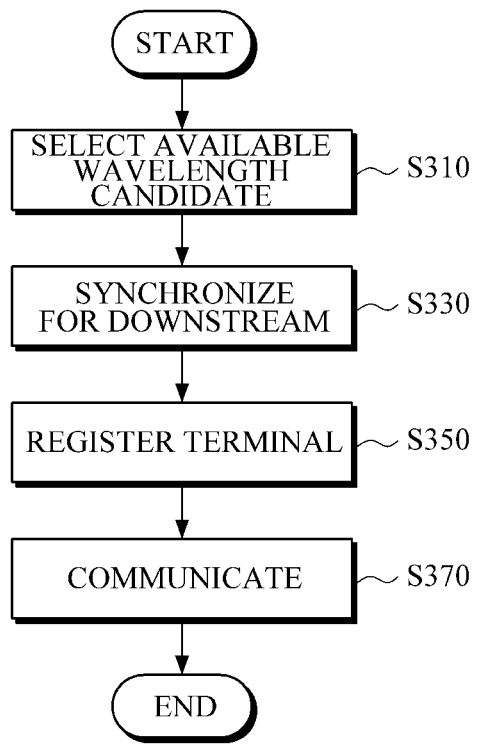
FIG. 3 is a flowchart illustrating a method of selecting a wavelength of an optical network unit according to an exemplary embodiment of the invention.

FIG. 3 is a flowchart illustrating a method of selecting a wavelength of an optical network unit according to an exemplary embodiment of the invention.

As illustrated in FIG. 3, the method of selecting the wavelength includes an available wavelength candidate selecting operation (S310), a downstream synchronization operation (S330), a terminal registration operation (S350), and a communication operation (S370).

In the available wavelength candidate selecting operation, a pre-loaded default wavelength is selected as an available wavelength candidate or the wavelength that has been changed when a preset wavelength changing condition is satisfied is selected as the available wavelength candidate (S310).

The available wavelength refers to a wavelength of the signal used for communication with the OLT by the terminal. The available wavelength candidate refers to a set of wavelengths can be used as the available wavelength.

The default wavelength is a wavelength used immediately after power is applied to the terminal and may be a wavelength stored in a non-volatile memory at the time of manufacturing the terminal. In addition, the default wavelength may be a wavelength that has been successfully registered in the terminal registration operation, which is stored in the non-volatile memory. In this way, when the wavelength that has been successfully registered is stored, the stored wavelength may be used later as the default wavelength in the re-registration operation of the terminal. As a result, it is possible to decrease a registration time of the terminal since the same initialization time is taken as the initialization time of the terminal used in the existing TDM-PON unless the OLT is changed.

The wavelength changing condition may be a condition where the frame synchronization is not acquired for a preset period of time in the downstream synchronization operation (S330) described below. Furthermore, the wavelength changing condition may be a condition where either a registration allowance message or a registration rejection message is not received for a preset period of time in the terminal registration operation (S350) described below. Moreover, the wavelength changing condition may be a condition where the registration allowance message is not received for a preset period of time in a waiting operation described below. Further, the wavelength changing condition may be a condition where a wavelength change request message is received from the OLT.

In the downstream synchronization operation, the frame synchronization is acquired for the downstream signal having the same wavelength as the selected available wavelength candidate (S330).

According to the exemplary embodiment, in the downstream synchronization operation, only the signal having the wavelength selected from among signals having all wavelengths for downstream is received by an optical receiver and frame (or bit) synchronization acquisition for the downstream signal is attempted. In this case, when the frame synchronization is acquired for a predetermined period of time, the operation proceeds to the terminal registration operation (S350). On the other hand, when the frame synchronization is not acquired for a predetermined period of time, the operation proceeds to the available wavelength candidate selecting operation (S310) by considering that a corresponding central office system is not connected or equipment uses a different protocol.

In the terminal registration operation, a registration request message is transmitted to the OLT from which the downstream signal has been transmitted, and when the registration allowance message is received from the OLT, the available wavelength candidate is assigned as the available wavelength used for communication with the OLT and the terminal is registered in the OLT (S350). The registration request message may include unique information containing serial information of the OLT. The registration allowance message may include a unique identification number (ID) of the OLT. When the terminal registration is succeeded (S350), the operation proceeds to the communication operation (S370).

According to the exemplary embodiment, in the terminal registration operation, the registration rejection message is received from the OLT. When the terminal receives the registration rejection message, the operation proceeds to the waiting operation.

In the communication operation, when the terminal is registered in the OLT, data transmission and reception with the OLT are performed (S370).

In the waiting operation, when the terminal is not registered in the OLT, the terminal maintains an emergency stop state until the registration allowance message is received.

Figure 4:
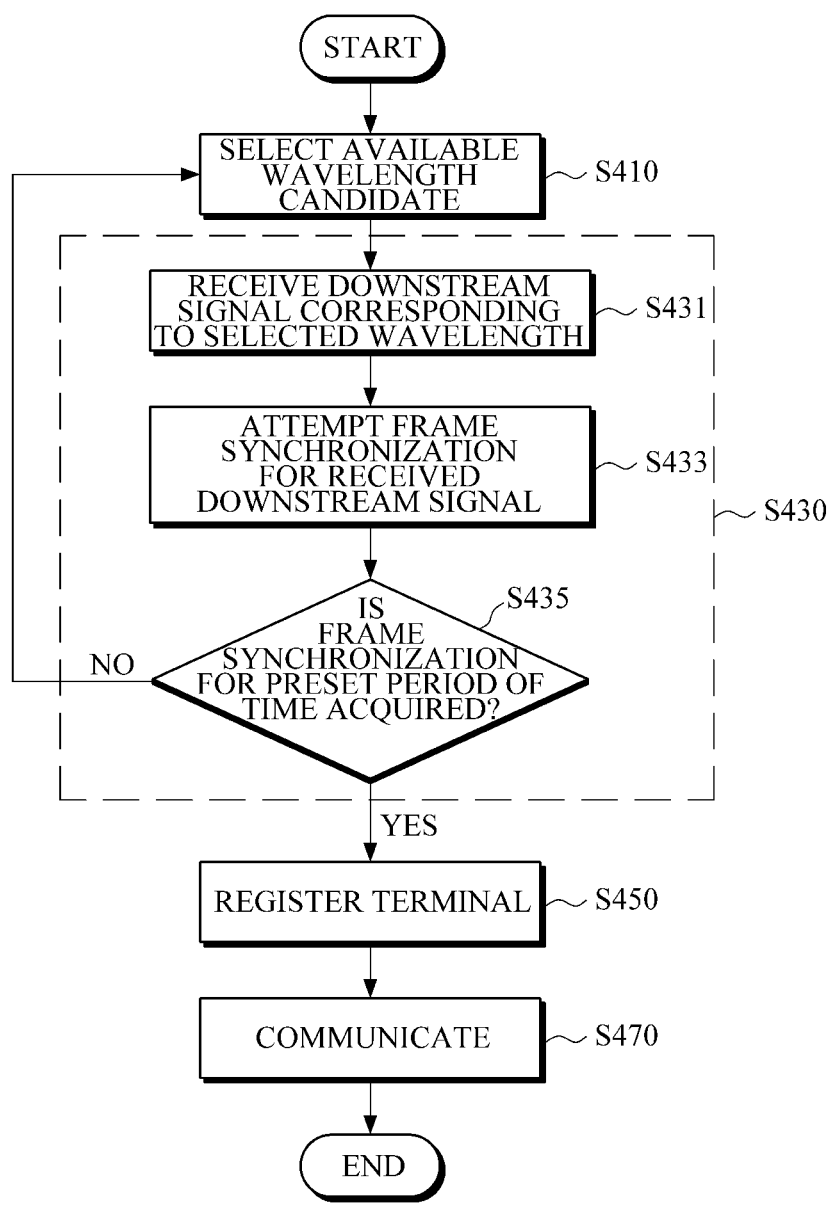
FIG. 4 is a flowchart illustrating a method of selecting the wavelength of the optical network unit when a wavelength changing condition is satisfied in a downstream synchronization operation according to an exemplary embodiment of the invention.
Figure 5:
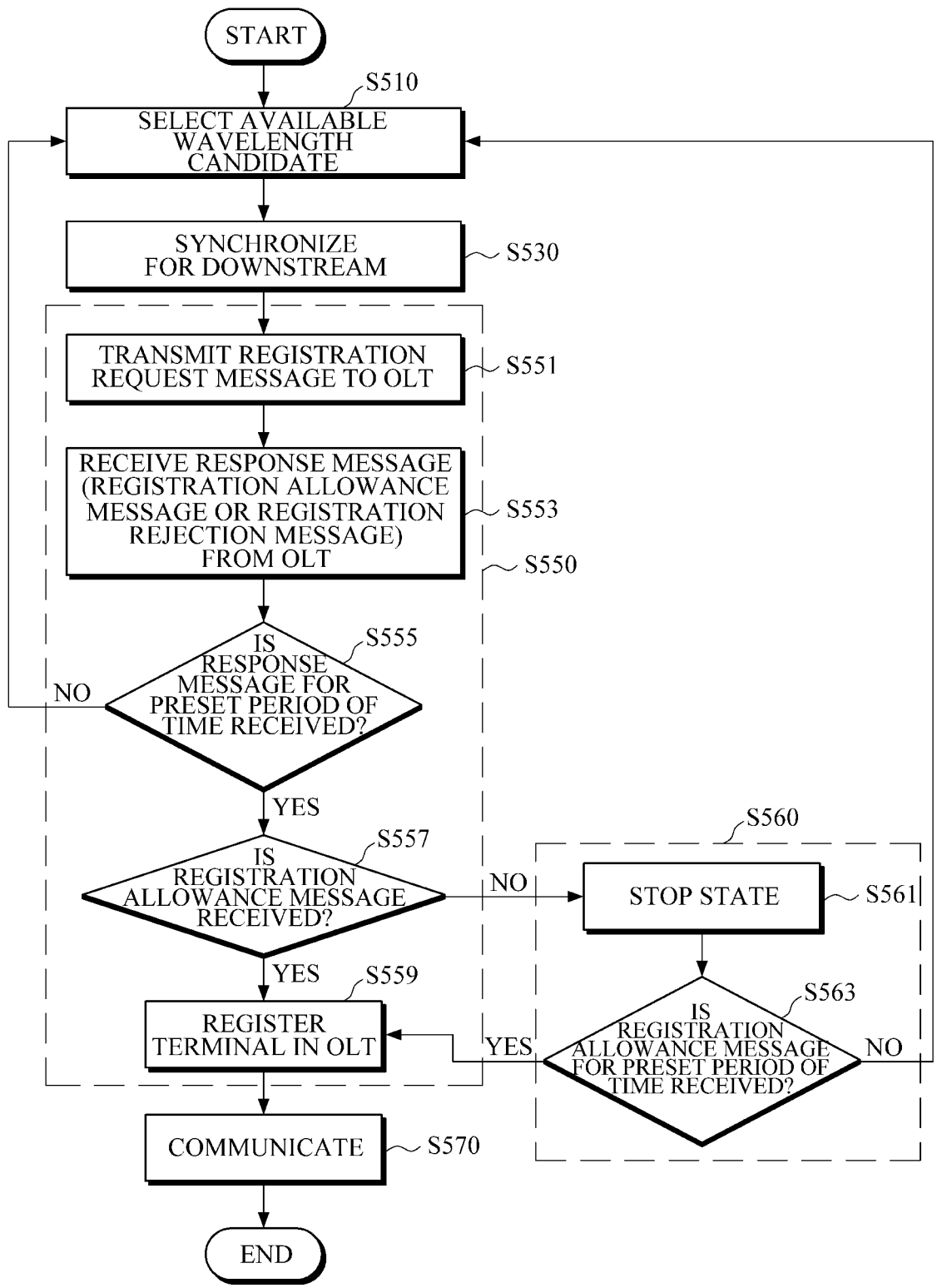
FIG. 5 is a flowchart illustrating a method of selecting the wavelength of the optical network unit when a wavelength changing condition is satisfied in a terminal registration operation according to an exemplary embodiment of the invention.

FIG. 4 is a flowchart illustrating a method of selecting the wavelength of the optical network unit when the wavelength changing condition is satisfied in the downstream synchronization operation according to an exemplary embodiment of the invention. FIG. 5 is a flowchart illustrating a method of selecting the wavelength of the optical network unit when the wavelength changing condition is satisfied in the terminal registration operation according to an exemplary embodiment of the invention.

As illustrated in FIG. 4, the method of selecting the wavelength includes an available wavelength candidate selecting operation (S410), a downstream synchronization operation (S430), a terminal registration operation (S450), and a communication operation (S470). Since the available wavelength candidate selecting operation (S410), the terminal registration operation (S450), and the communication operation (S470) are the same as the above-described operations, the detailed description thereof will not be repeated unless necessary.

Hereinafter, the method of selecting the wavelength will be described, focusing on the downstream synchronization operation (S430).

First, the optical network unit receives a downstream signal corresponding to the selected wavelength (S431). In this case, reception of the downstream signal may be performed by the optical receiver.

Then, frame synchronization is attempted for the received downstream signal (S433). The frame synchronization may be performed by the downstream synchronization unit. In this case, the downstream synchronization unit may be a part of a MAC processing unit.

Then, it is determined whether the frame synchronization is acquired for a preset period of time (S435). When the frame synchronization is acquired, the operation proceeds to the terminal registration operation (S450). On the other hand, when the frame synchronization is not acquired, the operation proceeds to the available wavelength candidate selecting operation (S410). In this case, in the available wavelength candidate selecting operation (S410), the wavelength is changed and a new available wavelength candidate is selected. When the wavelength is selected, the operation proceeds to the downstream synchronization operation (S430), and the above-described operations are repeated.

As illustrated in FIG. 5, the method of selecting the wavelength includes an available wavelength candidate selecting operation (S510), a downstream synchronization operation (S530), a terminal registration operation (S550), a communication operation (S570), and a waiting operation (S560). Since the available wavelength candidate selecting operation (S510), the downstream synchronization operation (S530), and the communication operation (S570) are the same as the above-described operations, the detailed description thereof will not be repeated unless necessary.

Hereinafter, the method of selecting the wavelength will be described, focusing on the terminal registration operation (S550) and the waiting operation (S560).

First, in the terminal registration operation (S550), when frame synchronization is acquired for the downstream signal, the registration request message is transmitted to the OLT (S551). In the case, transmission of the registration request message may be performed by an optical transmitter.

Then, a response message with respect to the registration request is received from the OLT (S553). In this case, reception of the response message may be performed by the optical receiver. Here, the response message includes the registration allowance message and the registration rejection message.

Then, it is determined whether the response message is received for a preset period of time (S555). In this case, the determination may be performed by a terminal controller. When the response message is received for a preset period of time, the operation proceeds to an operation determining whether the registration allowance message is received (S557). On the other hand, when the response message is not received for a preset period of time, the operation proceeds to the available wavelength candidate selecting operation (S510). In the available wavelength candidate selecting operation (S510), the wavelength is changed and a new available wavelength candidate is selected. When the wavelength is selected, the operation proceeds to the downstream synchronization operation (S530), and the above-described operations are repeated.

Then, it is determined whether the registration allowance message is received (S557). When the registration allowance message is received, the available wavelength candidate is assigned as the available wavelength used for communication with the OLT, the terminal is registered in the OLT, and the operation proceeds to the communication operation (S570). When the registration rejection message is received, the operation proceeds to the waiting operation (S560).

Next, in the waiting operation (S560), the terminal maintains a waiting state until the registration allowance message is received (S561).

Then, it is determined whether the registration allowance message is received for a preset period of time (S563). In this case, the determination may be performed by the terminal controller. When the registration allowance message is received for a preset period of time, the available wavelength candidate is assigned as the available wavelength used for communication with the OLT, the terminal is registered in the OLT, and the operation proceeds to the communication operation (S570). On the other hand, when the registration allowance message is not received for a preset period of time, the operation proceeds to the available wavelength candidate selecting operation (S510). In this case, in the available wavelength candidate selecting operation (S510), the wavelength is changed and a new available wavelength candidate is selected. When the wavelength is selected, the operation proceeds to the downstream synchronization operation (S530), and the above-described operations are repeated.

Figure 6:
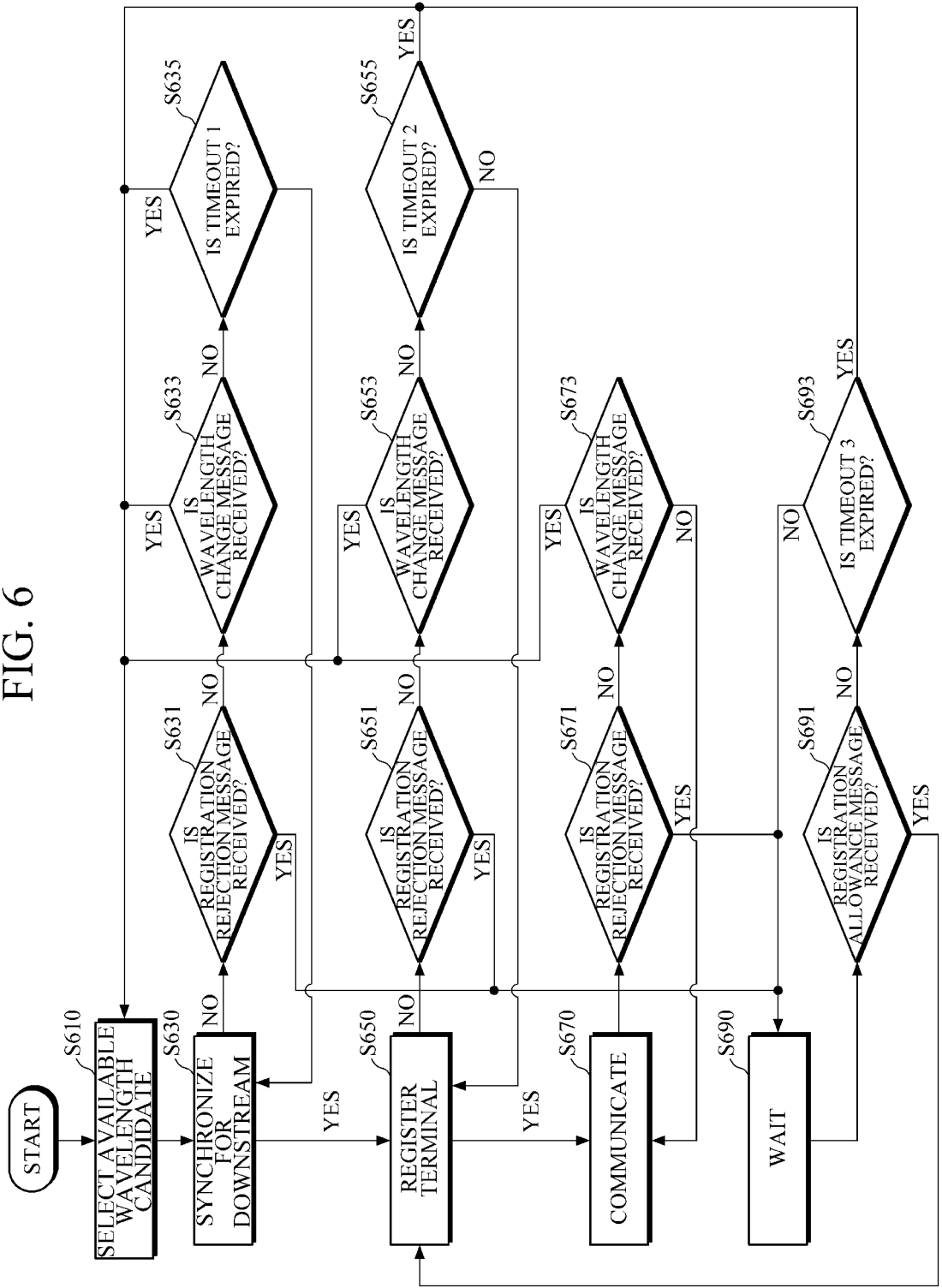
FIG. 6 is a flowchart illustrating a method of selecting the wavelength of the optical network unit when a registration rejection message or a wavelength change message is received according to an exemplary embodiment of the invention.

FIG. 6 is a flowchart illustrating a method of selecting the wavelength of the optical network unit when the registration rejection message or the wavelength change message is received according to an exemplary embodiment of the invention.

As illustrated in FIG. 6, the method of selecting the wavelength includes an available wavelength candidate selecting operation (S610), a downstream synchronization operation (S630), a terminal registration operation (S650), a communication operation (S670), and a waiting operation (S690). Since procedures performed in each operation are the same as the above-described operations, the detailed description thereof will not be repeated unless necessary. In each operation other than the available wavelength candidate selecting operation (S610) and the waiting operation (S690), the registration rejection message or the wavelength change message may be received from the OLT.

First, in the available wavelength candidate selecting operation, a pre-loaded default wavelength is selected as the available wavelength candidate or the wavelength that has been changed when a preset wavelength changing condition is satisfied is selected as the available wavelength candidate (S610).

In the downstream synchronization operation, frame synchronization is acquired for the downstream signal having the same wavelength as the selected available wavelength candidate (S630). When the frame synchronization is acquired for the downstream signal, the operation proceeds to the terminal registration operation (S650).

On the other hand, when the frame synchronization is not acquired for the downstream signal, it is determined whether the registration rejection message is received (S631). The determination may be performed by the terminal controller. When the registration rejection message is received, the operation proceeds to the waiting operation (S690).

On the other hand, when the registration rejection message is not received, it is determined whether the wavelength change message is received (S633). When the wavelength change message is received, the operation proceeds to the available wavelength candidate selecting operation (S610).

On the other hand, when the wavelength change message is not received, it is determined whether a preset time is expired (S635). When the preset time (timeout 1) is expired, the is operation proceeds to the available wavelength candidate selecting operation (S610), and the above-described operations are repeated. On the other hand, when the preset time (timeout 1) is not expired, the downstream synchronization is attempted again, and the above-described operations are repeated.

Then, in the terminal registration operation, the available wavelength candidate is assigned as the available wavelength, and the terminal is registered in the OLT for communication with the OLT. When the terminal is registered in the OLT, the operation proceeds to the communication operation (S670).

On the other hand, when the terminal is not registered in the OLT, it is determined whether the registration rejection message is received (S651). In this case, the determination may be performed by the terminal controller. When the registration rejection message is received, the operation proceeds to the waiting operation (S690).

On the other hand, when the registration rejection message is not received, it is determined whether the wavelength change message is received (S653). When the wavelength change message is received, the operation proceeds to the available wavelength candidate selecting operation (S610).

On the other hand, when the wavelength change message is not received, it is determined whether a preset time is expired (S655). When the preset time (timeout 2) is expired, the operation proceeds to the available wavelength candidate selecting operation (S610), and the above-described operations are repeated. When the preset time (timeout 2) is not expired, the downstream synchronization is attempted again, and the above-described operations are repeated.

Then, in the communication operation (S670), when the terminal is registered in the OLT, data transmission and reception with the OLT are performed.

Moreover, it is determined whether the registration rejection message is received (S671). In this case, the determination may be performed by the terminal controller. When the registration rejection message is received, the operation proceeds to the waiting operation (S690).

On the other hand, when the registration rejection message is not received, it is determined whether the wavelength change message is received (S673). When the wavelength change message is received, the operation proceeds to the available wavelength candidate selecting operation (S610). On the other hand, when the wavelength change message is not received, the operation proceeds to the communication operation (S670), and the above-described operations are repeated.

In the waiting operation, when the terminal is not registered in the OLT, the terminal maintains the emergency stop state (S690).

Moreover, it is determined whether the registration allowance message is received (S691). In this case, the determination may be performed by the terminal controller. When the registration allowance message is received, the operation proceeds to the terminal registration operation (S650).

On the other hand, when the registration allowance message is not received, it is determined whether a preset time is expired (S693). When the preset time (timeout 3) is expired, the operation proceeds to the available wavelength candidate selecting operation (S610) and the above-described operations are repeated. On the other hand, when the preset time (timeout 3) is not expired, the operation proceeds to the waiting operation again (S690), and the above-described operations are repeated.

Figure 7:
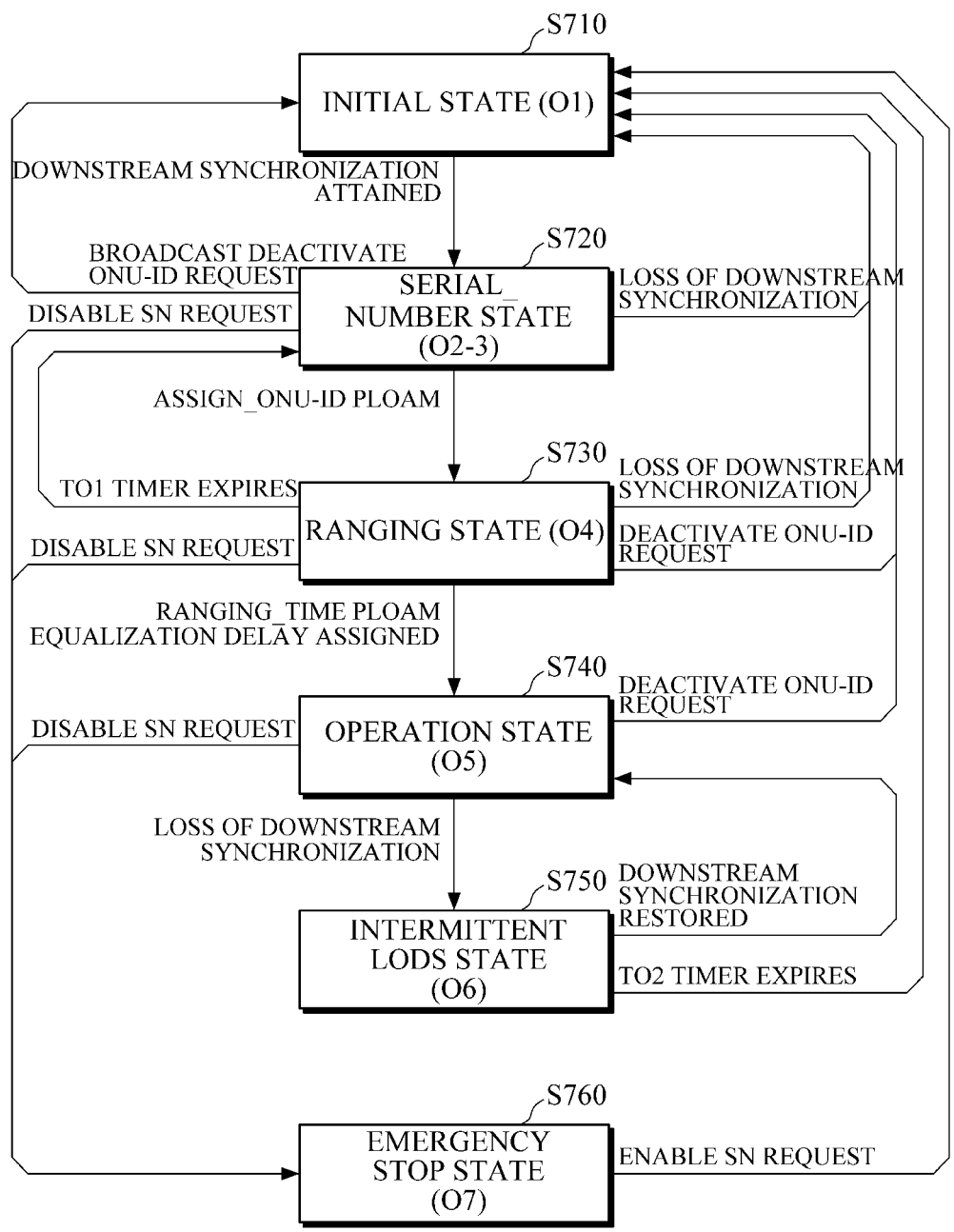
FIG. 7 is a flowchart illustrating an initialization process of an XGPON optical network unit recommended in ITU-T G.987.3.
Figure 8:
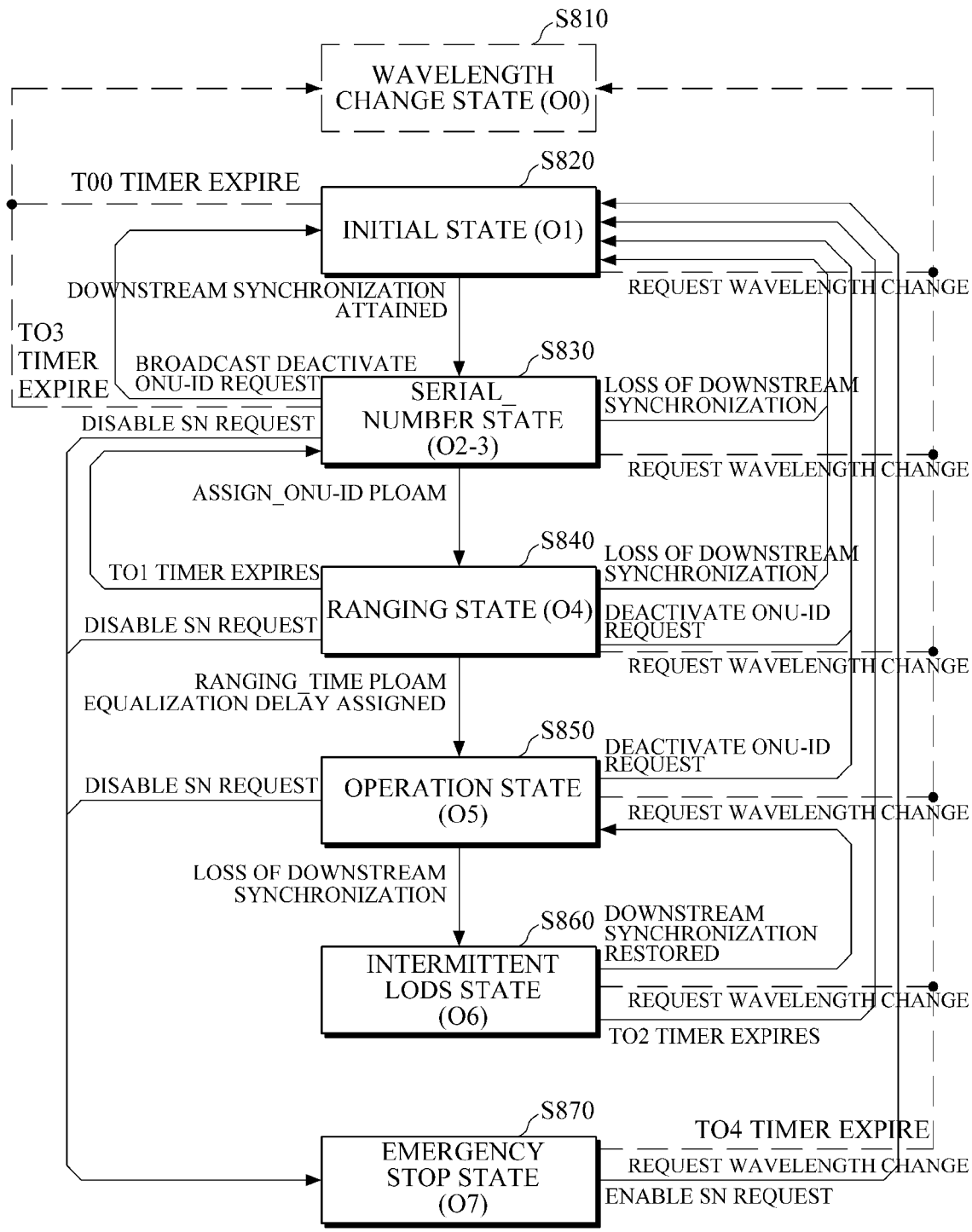
FIG. 8 is a flowchart illustrating an initialization process of the optical network unit according to an exemplary embodiment of the invention.

FIG. 7 is a flowchart illustrating an initialization process of an XGPON optical network unit recommended in ITU-T G.987.3. FIG. 8 is a flowchart illustrating an initialization process of the optical network unit according to an exemplary embodiment of the invention.

As illustrated in FIG. 7, the initialization process of the XGPON optical network unit includes an initial state (S710), a serial_number state (S720), a ranging state (S730), an operation state (S740), an intermittent LODS state (S750), and an emergency stop state (S760). All terminals are registered in the OLT and are provided with services through this initialization process.

First, in the initial state, after power is supplied to the terminal, synchronization for the downstream signal is attempted in order to register the terminal in the OLT (S710). Here, when the frame synchronization for the downstream signal transmitted from the OLT is acquired, the state proceeds to the serial_number state (S720).

Then, in the serial_number state, unique information of the terminal including a serial number of the terminal is transmitted to the OLT in order to express registration intention to the OLT (S720). In this case, when the OLT checks the serial number of the terminal and allows registration, an ONU unique identification number (ONU ID) is assigned, and the registration allowance message including the ONU ID is transmitted. When the terminal receives the registration allowance message, the state proceeds to the ranging state (S730).

Moreover, when the OLT checks the serial number of the terminal and rejects registration or cancel or hold service provided for the registered terminal, the registration rejection message (Disable SN request) is transmitted to the terminal. When the terminal receives the registration rejection message, the state proceeds to the emergency stop state (S760), and the terminal waits for re-allowance from the OLT.

Then, in the ranging state, a distance between the terminal and the OLT is measured and the registration of the terminal is attempted (S730).

Then, in the operation state, normal data transmission and reception with the OLT are performed (S740).

In the emergency stop state O7, the terminal waits for re-allowance from the OLT (S760).

As illustrated in FIG. 8, the initialization process of the TWDM ONU includes a wavelength change state (S810), an initial state (S820), a serial_number state (S830), a ranging state (S840), an operation state (S850), an intermittent LODS state (S860), and an emergency stop state (S870). All terminals are registered in the OLT and are provided with services through this initialization process. Hereinafter, the states will be described, focusing on the wavelength change state which is further included.

First, in the wavelength change state, a transmitting or receiving wavelength is changed when another state proceeds to this state (S810). The default wavelength stored in the non-volatile memory is initially selected and the state proceeds to the initial state (S820).

In the initial state (S820), when synchronization for the downstream signal is not acquired for an arbitrary time (several ms), it is considered that an OLT corresponding to the wavelength is not connected or another system is connected, and the state proceeds to the wavelength change state (S810).

A plurality of wavelength change methods may be used. For example, a sequentially increasing method in which an order of available wavelengths is determined in advance and the order is sequentially changed, a priority order method, and a random order method may be used.

In this case, when the frame synchronization for the downstream signal is acquired, the state proceeds to the serial_number state (S830) likewise the existing ONU.

Then, in the serial_number state, unique information of the terminal including the serial number of the terminal is transmitted to the OLT and registration of the terminal is requested (S830). When the registration allowance message including the unique identification number (ID) of the OLT is received, the state proceeds to the ranging state (S840). On the other hand, when the registration rejection message (Disable SN request) is received from the OLT, the state proceeds to the emergency stop state (S870). In this case, in the serial_number state, since the ONU may continue to stay in the serial_number state when the existing OLT does not allow registration of the ONU and does not send the registration rejection message, after a TO3 timer expires, the state proceeds to the wavelength change state (S810).

Then, in the ranging state (S840), a distance between the terminal and the OLT is measured and the terminal is registered in the OLT. When the terminal is registered, the state proceeds to the operation state (S850).

Then, in the operation state, communication with the OLT is performed (S850). In the operation state, the acquired wavelength information may be stored in the non-volatile memory. Since the wavelength change requires a certain amount of time, a registration time of the ONU increases due to many tunable wavelengths. However, since the acquired wavelength information is stored in the non-volatile memory, the wavelength that has been successfully registered is used as the default wavelength when the same ONU registers again. Therefore, it is possible to take the same initialization time as the ONU used in the existing PON unless the OLT is changed.

Then, in the intermittent LODS state, the downstream synchronization is attempted again, and restoration is attempted (S860).

In the emergency stop state, a stop state is maintained until the registration allowance message is received (S870). The waiting state is maintained until the registration allowance message is received in the existing GPON or XGPON. However, according to the exemplary embodiment, when the registration allowance message is not received for a preset time (TO4), the state proceeds to the wavelength change state (S810). Since even a normal ONU may temporarily delay the ONU registration according to conditions unpredictable by the OLT, the wavelength change may be determined after waiting a certain period of time in order for the ONU to determine definite registration rejection intention from the OLT.

As described above, the method in FIG. 8 may be performed by adding only state management function software to a newly manufactured wavelength tunable ONU without modification of and addition to a system of the existing OLT other than an optical component. As a result, it is possible to build a cost effective and efficient TWDM-PON network.

The ONU initialization process of the GPON or XGPON is performed through a physical layer operation and management (PLOAM) frame defined between the OLT and the terminal and is processed by software. When the state management software of the OLT can be modified with an additional method, the wavelength change request message is newly defined, and the OLT uses this wavelength change request message to express definite rejection intention to the ONU, so that the ONU can proceed to the wavelength change state (O0) upon receiving this message and save a registration time for the ONU. In this case, the wavelength change request message may be made by modifying an existing PLOAM or adding a new PLOAM.

A Disable_serial_Number message in the PLOAM defined in G.987.3 is used to deliver the registration rejection request (Disable SN request) or the registration allowance request (Enable SN request) described above. Following table describes the Disable_serial_Number message in the PLOAM.

TABLE 1

| Byte | Content | Description |
|---|---|---|
| 1-2 | 0x03FF | Broadcast ONU-ID |
| 3 | 0x06 | Message type ID "Disable_serial_number" |
| 5 | Disable/Enable | 0xFF: The ONU with this serial number is denied upstream access<br>0x00: The ONU with this serial number is allowed upstream access<br>0x0F: All ONUs are denied upstream access.<br>0x3F: The ONUs in an O2-3 state are denied upstream access<br>0xF0: All ONUs are denied upstream access |
| 6-9 | Vendor-ID | ONU vender-ID code |
| 10-13 | VSSN | Vendor-specific serial number |
| 14-40 | Padding | Set to 0x00 |
| 41-48 | MIC | Message integrity check |

The wavelength change request message is newly added to the PLOAM proposed in above Table 1 and is defined as the following.

Add to the Disable/Enable section;

0x7F: The ONU with this serial number requests to change a wavelength

0x1F: All ONUs request to change a wavelength

Figure 9:
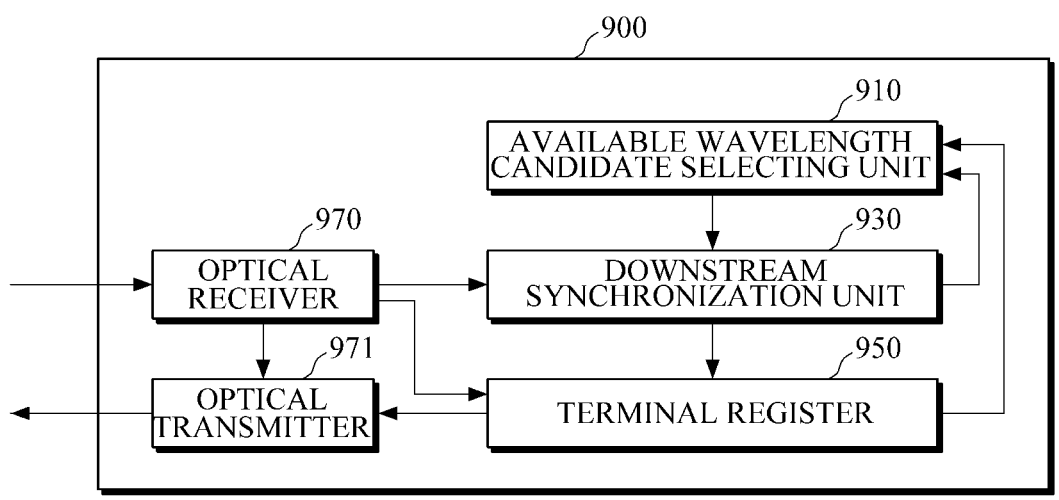
FIG. 9 is a diagram illustrating a configuration of a device for selecting a wavelength of an optical network unit according to another exemplary embodiment of the invention.

FIG. 9 is a diagram illustrating a configuration of a device for selecting a wavelength of an optical network unit according to another exemplary embodiment of the invention.

Figure 10:
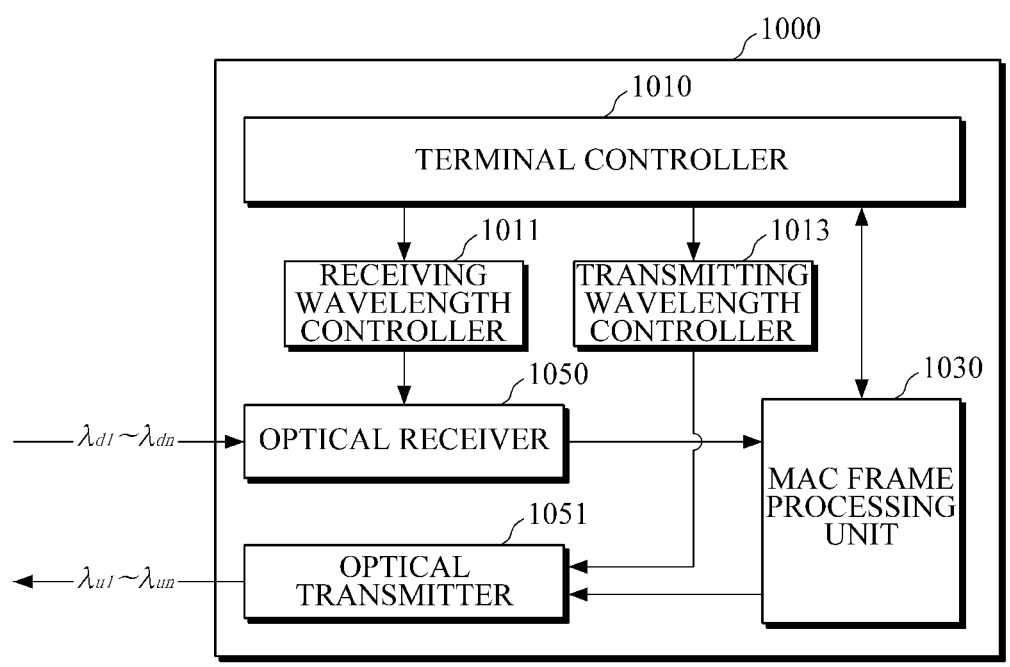
FIG. 10 is a diagram illustrating a configuration of the optical network unit according to another exemplary embodiment of the invention.

FIG. 10 is a diagram illustrating a configuration of the optical network unit according to another exemplary embodiment of the invention.

As illustrated in FIG. 9, a wavelength selection device 900 may include a available wavelength candidate selecting unit 910, a downstream synchronization unit 930, a terminal register 950, an optical receiver 970, and an optical transmitter 971.

The wavelength selecting unit 910 selects a pre-loaded default wavelength as an available wavelength candidate or selects the wavelength that has been changed when a preset wavelength changing condition is satisfied as the available wavelength candidate.

In this case, the wavelength changing condition may include a condition where frame synchronization is not acquired for a preset period of time in the downstream synchronization unit. Moreover, the wavelength changing condition may be a condition where either a registration allowance message or a registration rejection message is not received for a preset period of time in the terminal register. Further, the wavelength changing condition may be a condition where a wavelength change request message is received from an OLT. The detailed description thereof is the same as in the wavelength selecting method described above.

The downstream synchronization unit 930 acquires the frame synchronization for a downstream signal having the same wavelength as the selected available wavelength candidate.

The terminal register 950 transmits a registration request message to the OLT from which the downstream signal has been transmitted when the frame synchronization is acquired, assigns the available wavelength candidate to the available wavelength used for communication with the OLT and registers the terminal in the OLT when a registration allowance message is received from the OLT.

The optical receiver 970 receives optical signals from the OLT

The optical transmitter 971 transmits optical signals to the OLT.

As illustrated in FIG. 10, an optical network unit 1000 includes an optical receiver 1050 and an optical transmitter 1051 for transmission and reception of the optical signals, a MAC frame processing unit 1030, a receiving wavelength controller 1011, a transmitting wavelength controller 1013 and a terminal controller 1010.

The optical receiver 1050 receives only a signal having the wavelength selected by the terminal controller 1010 and the receiving wavelength controller 1011 among signals having all wavelengths for downstream, restores the signal, and delivers the signal to the MAC frame processing unit 1030. The ONU initially selects one arbitrary wavelength. In this case, the wavelength that previously stored in a non-volatile memory, for example, a flash memory, is used. Then, an appropriate available wavelength is updated in the memory from the OLT. Wavelengths for upstream and downstream are defined as a pair and the upstream and downstream wavelengths are simultaneously changed at the time of changing a wavelength.

The optical transmitter 1051 transmits only a signal having the wavelength selected by the terminal controller 1010 and the transmitting wavelength controller 1013 among signals having all wavelengths for downstream to the OLT.

The terminal controller 1010 reads the default wavelength from the non-volatile memory, selects the default wavelength as the available wavelength candidate, and respectively sends selected wavelength information necessary for upstream and downstream to the receiving wavelength controller 1011 and the transmitting wavelength controller 1013. When the wavelength changing condition is satisfied, the terminal controller simultaneously changes the upstream and downstream wavelengths and selects a new wavelength as the available wavelength candidate. For this purpose, the terminal controller operates its own timer or receives, for example, the registration rejection message, the registration allowance message, and the wavelength change message, from the OLT. In this case, examples of the wavelength selection method may include a sequentially increasing method, a priority order method, or a random order method.

The receiving wavelength controller 1011 uses wavelength information selected by the terminal controller 1010 and generates a control signal necessary to physically operate the optical receiver 1050.

The transmitting wavelength controller 1013 uses wavelength information selected by the terminal controller 1010 and generates a control signal necessary to physically operate the optical transmitter 1051. In order for the transmitting wavelength controller 1013 and the receiving wavelength controller 1011 to control transmitting and receiving wavelengths of the optical transmitter 1051 and the optical receiver 1050, a variety of methods using, for example, voltage, current, and temperature, according to characteristics of the optical transmitter 1051 and the optical receiver 1050 may be used, but the invention is not limited thereto.

The MAC frame processing unit 1030 processes a MAC frame in a PON section, and extracts control frame information from receiving data and delivers the information to the terminal controller 1010 to share a control channel with the OLT. Moreover, the MAC frame processing unit 1030 transmits control information received from the terminal controller 1010 to the OLT, generates data to be sent to the OLT, and delivers the data to the wavelength tunable optical transmitter 1051.

The exemplary embodiments should be considered in a descriptive sense only and the scope of the invention is not limited thereto.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of selecting a wavelength of an optical network unit (ONU), comprising:

selecting, as an available wavelength candidate, a pre-loaded default wavelength or a wavelength corresponding to a wavelength changed in response to a preset wavelength changing condition being satisfied;

acquiring frame synchronization for a downstream signal having a same wavelength as the selected available wavelength candidate;

transmitting a registration request message to an optical line terminal (OLT) from which the downstream signal has been transmitted when the frame synchronization is acquired, and assigning, as an available wavelength to be used for communication with the OLT when a registration allowance message is received from the OLT, the wavelength of the selected available wavelength candidate; and registering the ONU in the OLT.

2. The method of claim 1, further comprising communicating with the OLT when the ONU is registered in the OLT.

3. The method of claim 2, further comprising, when a registration rejection message is received from the OLT, waiting to maintain a stop state until the registration allowance message is received.

4. The method of claim 1, wherein the preset wavelength changing condition is a condition where the frame synchronization is not acquired for a preset period of time in the acquiring frame synchronization for a downstream signal.

5. The method of claim 1, wherein the preset wavelength changing condition is a condition where either the registration allowance message or a registration rejection message is not received for a preset period of time in the registering the ONU in the OLT.

6. The method of claim 3, wherein the preset wavelength changing condition is a condition where the registration allowance message is not received for a preset period of time in the waiting to maintain a stop state.

7. The method of claim 3, wherein the preset wavelength changing condition is a condition where a wavelength change request message is received from the OLT.

8. The method of claim 1, wherein the method of selecting the wavelength is performed through a predefined physical layer operation and management (PLOAM) frame between the OLT and the ONU.

9. The method of claim 1, wherein the selecting of the pre-loaded default wavelength includes using a sequentially increasing method, an order of priority method, or a random order method.

10. The method of claim 1, wherein the pre-loaded default wavelength is preset and stored in order to initially use in the registering of the ONU.

11. The method of claim 1, wherein the registering the ONU in the OLT further includes storing information about the available wavelength assigned when the ONU is registered, and wherein the selecting of the available wavelength candidate is selecting the wavelength corresponding to the stored information as the default wavelength.

12. The method of claim 1, wherein a changing of the wavelength is simultaneously performed for wavelengths of upstream and downstream signals in the selecting of the available wavelength candidate.

13. The method of claim 1, wherein the registration request message includes unique information containing serial number information of the OLT.

14. The method of claim 1, wherein the registration allowance message includes a unique identification number of the OLT.

15. A device for selecting a wavelength of an optical network unit (ONU) comprising non-transitory computer-readable code tangibly embodied in a computer-readable recording medium, the computer-readable code when executed implementing:

an available wavelength candidate selecting unit configured to select, as an available wavelength candidate, a pre-loaded default wavelength or a wavelength corresponding to a wavelength changed in response to a present wavelength changing condition being satisfied;

a downstream synchronization unit configured to acquire frame synchronization for a downstream signal having a same wavelength as the selected available wavelength candidate; and a terminal registration unit configured to transmit a registration request message to an optical line terminal (OLT) from which the downstream signal has been transmitted when the frame synchronization is acquired, assign, as an available wavelength to be used for communication with the OLT when a registration allowance message is received from the OLT, the wavelength of the selected available wavelength candidate, and register the ONU in the OLT.

16. The device of claim 15, wherein the preset wavelength changing condition is a condition where the frame synchronization is not acquired for a preset period of time in the downstream synchronization unit.

17. The device of claim 15, wherein the preset wavelength changing condition is a condition where either the registration allowance message or a registration rejection message is not received for a preset period of time in the terminal register.

18. The device of claim 15, wherein the preset wavelength changing condition is a condition where a wavelength change request message is received from the OLT.

* * * * *